UNITED STATES PATENT OFFICE.

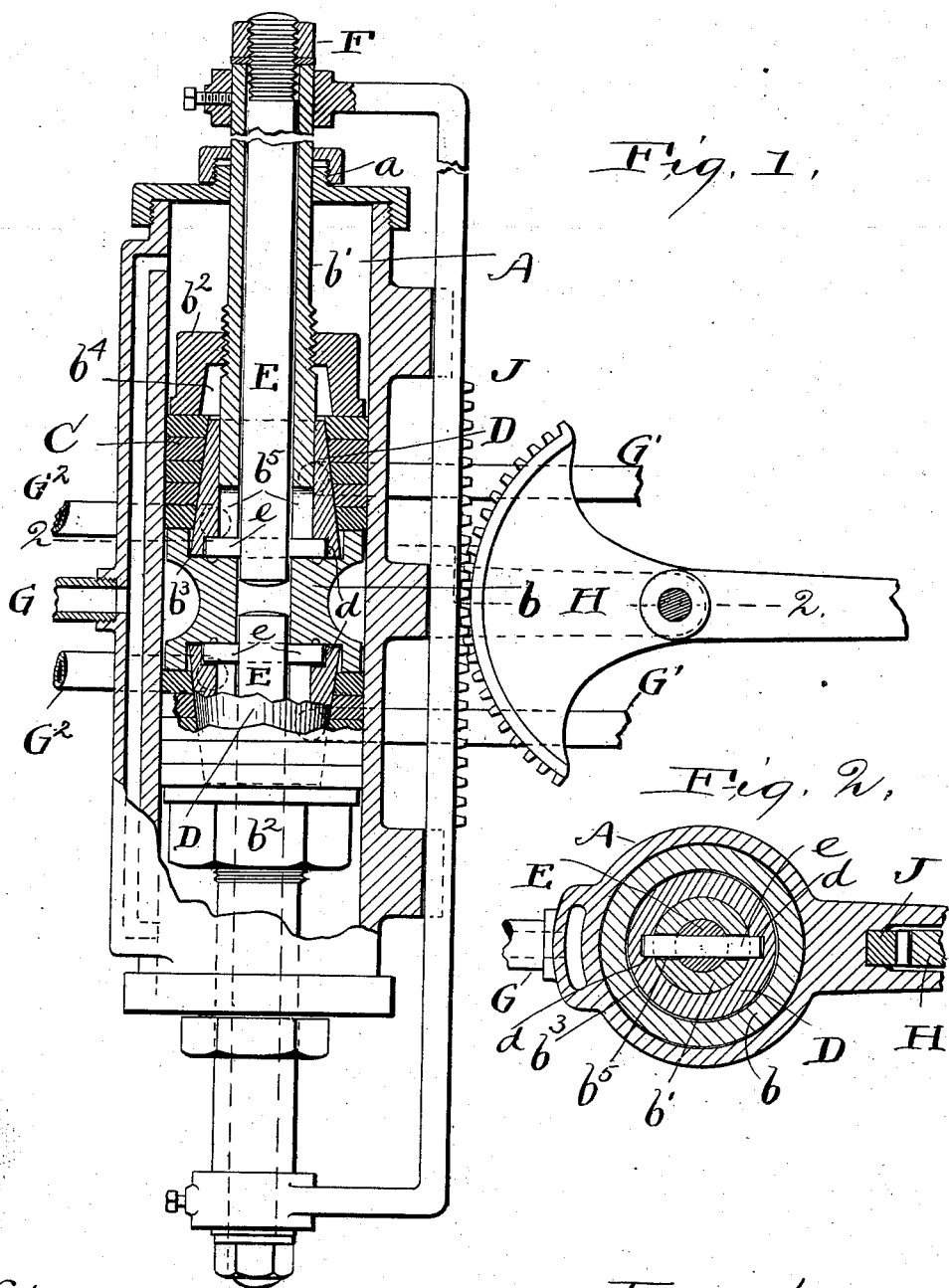

WILLIAM HESTON, OF HOMESTEAD, PENNSYLVANIA.

PISTON.

SPECIFICATION forming part of Letters Patent No. 657,600, dated September 11, 1900.

Application filed October 9, 1899. Serial No. 733,001. (No model.)

*To all whom it may concern:*

Be it known that I, WILLIAM HESTON, a citizen of the United States, residing at Homestead, in the county of Allegheny and State of Pennsylvania, have invented a certain new and useful Improvement in Pistons, of which the following is a full, clear, and exact description, reference being had to the accompanying drawings.

The object of this invention is to provide novel means whereby the packing-rings of a piston may be expanded without necessarily removing the piston from its cylinder. The invention is especially valuable when applied to hydraulic piston-valves, and it is so shown in the drawings, but it is applicable to and of greater or less value with any kind of a piston.

The invention consists in the combinations hereinafter described, and pointed out definitely in the claims.

In the drawings, Figure 1 is a central longitudinal section of my improved piston and its cylinder; and Fig. 2 is a horizontal sectional view on line 2 2 of Fig. 1.

In the construction shown the invention is applied to the piston on both sides of the central head, whereby the piston is better adapted for that use for which this particular embodiment of the invention is organized—viz., as a balanced hydraulic piston-valve. Obviously, however, this is mere duplication and unnecessary, and therefore the description of the combination of parts constituting the invention, shown in the drawings above the central head, will be found to apply to the combination of parts below said head.

Referring to the parts by letters, A represents the cylinder, in which the piston is movable. The inlet port or pipe is designated G. The pipes leading to and from the machinery to be operated are G' and the exhaust pipes from the valve $G^2$. The piston-body shown consists of a head $b$, having an annular recess about it and a tubular stem $b'$, extending from it, and is shiftable by the racked yoke J, which meshes with the operating-segment H. At either extreme operative position of the piston, which in the drawings is either side of the center a distance about equal to the distance across the annular recess in the head, the annular recess couples one of the pipes G' from the machinery with the corresponding exhaust-pipe $G^2$, while the other pipe $G^2$ is closed and the pipe G' to the machinery is coupled with the pipe G around the end of the piston. The head $b$ will fit the cylinder as nearly as desirable or practicable, and the stem $b'$ will be extended out through a stuffing-box $a$ in the end of the cylinder.

$b^2$ is an adjustable collar which is screwed onto the stem. The packing-rings C, which embrace the stem, are held between this collar $b^2$ and the head $b$. These rings may be made of any suitable material and have any suitable construction, provided they are capable of expansion by substantially the means provided. I prefer to make them of leather. These rings do not come into direct contact with the stem, but do embrace a tapered sleeve D, which in turn embraces and is movable upon the stem. In the proximate face of the head $b$ and collar $b^2$ are the annular recesses $b^3$ $b^4$, respectively, into which the ends of said sleeve may project, and these recesses are deep enough to permit as much endwise movement of the sleeve as is desirable.

In the tubular stem $b'$ a longitudinally-movable rod E is fitted, its outer end projecting beyond the end of said stem. The projecting outer end is threaded for the reception of the nut F, which bears against the end of the stem. At the inner end of this rod are the laterally-projecting fingers $e$ $e$, which extend through longitudinal slots $b^5$ in the stem $b'$ and engage with the tapered sleeve D, entering the notches $d$ in the large end thereof. Now when it is desired to expand the packing-rings C to take up wear or for any other reason the rod E is drawn outward by screwing the nut F against the end of the stem $b'$, and this movement of said rod is transmitted by the fingers $e$ to the tapered sleeve D, which is thereby moved endwise toward its small end. The packing-rings are prevented from endwise movement by the collar $b^2$, and they are therefore expanded proportionately to the movement of said sleeve D.

Having described my invention, I claim—

1. The combination of a piston-head, a tubular stem extending therefrom, a tapered sleeve slidably mounted upon said stem, a rod within the stem, a projection on said rod extending through a slot in the stem into engagement with said sleeve, expansible packing-rings around the sleeve adapted to be pressed outward thereby, and a follower in threaded engagement with the stem and adapted to press said packing-rings toward the piston-head, there being provided an annular recess about the stem on the operative side of said follower into which the end of the tapered sleeve may take, substantially as described.

2. The combination of a piston-head having an annular recess on one side, a tubular stem extending from said head, a tapered sleeve slidably mounted upon said stem and adapted to occupy said recess, a rod within said stem, a cross-key on said rod extending through slots in the stem and taking into openings in said sleeve, expansible packing-rings surrounding said sleeve and adapted to be expanded thereby, and a follower in threaded engagement with the sleeve and having a projecting flange bearing against said packing-rings whereby the follower may compress the packing-rings between it and the piston while leaving an annular recess about the stem into which said tapered sleeve may take, substantially as described.

In testimony whereof I hereunto affix my signature in the presence of two witnesses.

WILLIAM HESTON.

Witnesses:
ALBERT H. BATES,
E. L. THURSTON.